May 8, 1962 C. C. WRIGLEY ETAL 3,033,319
BRAKE ADJUSTER
Filed April 6, 1960 2 Sheets-Sheet 2
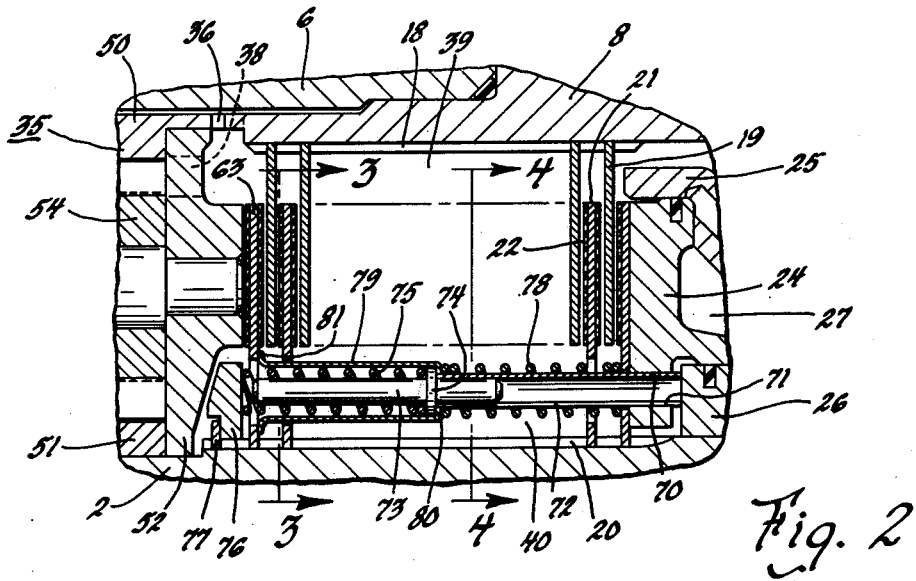
Fig. 2
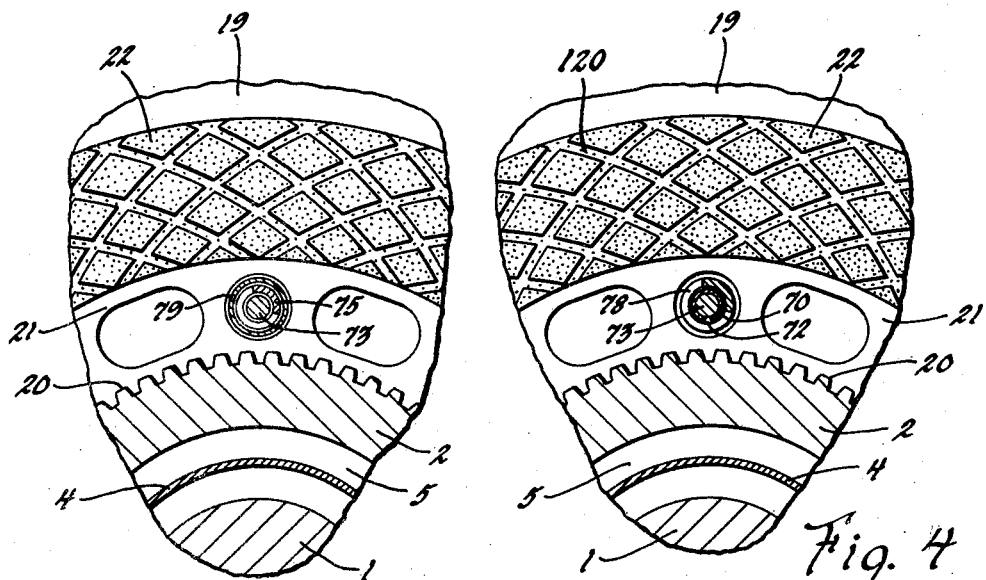
Fig. 3
Fig. 4
INVENTORS
Clifford C. Wrigley
John D. Malloy
BY
THEIR ATTORNEY United States Patent Office 3,033,319
Patented May 8, 1962

3,033,319
BRAKE ADJUSTER
Clifford C. Wrigley, Grosse Pointe Woods, and John D. Malloy, Royal Oak, Mich., assignors to General Motors Corporation, Detroit, Mich., a corporation of Delaware
Filed Apr. 6, 1960, Ser. No. 20,424
9 Claims. (Cl. 188—18)

This invention relates to a vehicle brake and more particularly to an automatic adjuster and retraction means for a vehicle brake.

The brake illustrated in this patent application employs a planetary gear pump for circulating the cooling fluid through the braking structure. The planetary gear pump is placed between a reaction plate and the disk stack and also employs a thermal expanding means within the cooling fluid pump. The thermal expansion of this device creates frictional engagement of the fluid pump which, in turn, provides circulation of the cooling fluid in direct response to the frictional engagement of the cooling fluid pump with the reaction plate and one of the stator disks.

This invention is intended to operate with the above-described brake and to provide an automatic brake adjuster and brake retraction means in combination with a pre-engaging mechanism to frictionally engage the cooling fluid pump and initially accelerate the cooling fluid pump prior to positive brake engagement of the vehicle disk brakes. The brake adjuster is mounted within the inner periphery of the braking structure.

It is an object of this invention to provide an automatic brake adjuster which maintains a predetermined clearance between the brake disks of the vehicle brake.

It is another object of this invention to provide in combination with the brake adjuster a retraction means for a hydraulic annular wheel piston which actuates the vehicle brakes.

It is a further object of this invention to provide a pre-engaging means in combination with the brake adjuster to provide initial operation of a cooling fluid pump prior to full brake actuation.

It is a further object of this invention to provide a combined automatic brake adjuster and brake retraction means as well as a reaction means on one of the stator disks to provide limited operation of the cooling fluid brake in response to an actuating force of an expandable means mounted within the cooling fluid pump. The reaction means is in combination with the pre-engaging mechanism and limits the clearance between one of the stationary brake disks and the reaction plate.

The objects of this invention are accomplished in a vehicle disk brake by employing the combination brake adjuster and retraction means within the inner periphery of the braking disks. The disk brake is actuated by an annular hydraulic cylinder and piston. A reaction means is placed on the opposite of the disk stack to receive the actuating force in actuation of the vehicle brakes. A cooling fluid pump is positioned between the reaction plate and the disk stack. Upon actuation of the vehicle brakes, the cooling fluid pump housing is retarded in its rotation relative to the ring gear which forms the outer periphery of the cooling pump. This retardation of the cooling fluid pump housing creates a pumping action in response to the engagement of the vehicle brakes.

In combination with the cooling fluid pump are employed a plurality of heat responsive expandable elements. These elements expand between one of the stator disks and the reaction plate and provide limited operation of the cooling fluid pump in response to the temperature of the cooling fluid.

The automatic brake adjuster automatically provides clearance between the brake disks as the hydraulic piston is retracted after the actuation of the vehicle brakes. The automatic adjuster employs a spring in combination which retracts the hydraulic wheel piston as the brakes are released.

A spring and sleeve arrangement is employed in combination with a brake adjuster to engage the stator disk with the cooling fluid pump housing prior to positive engagement of the vehicle brakes. This provides an initial acceleration of the cooling fluid pump prior to positive actuation of the brakes. The pre-engaging means eliminates a sudden shock in the starting of the fluid cooling pump as the vehicle brakes are actuated.

Further objects and advantages of the present invention will be apparent from the following description, reference being had to the accompanying drawings wherein preferred embodiments of the present invention are clearly shown.

In the drawings:

FIGURE 2 is an enlarged cross-section view of the automatic brake adjuster and retraction means.

FIGURE 3 is a cross-section view taken on line 3—3 of FIGURE 2.

FIGURE 4 is a cross-section view taken on line 4—4 of FIGURE 2.

Figure 1:
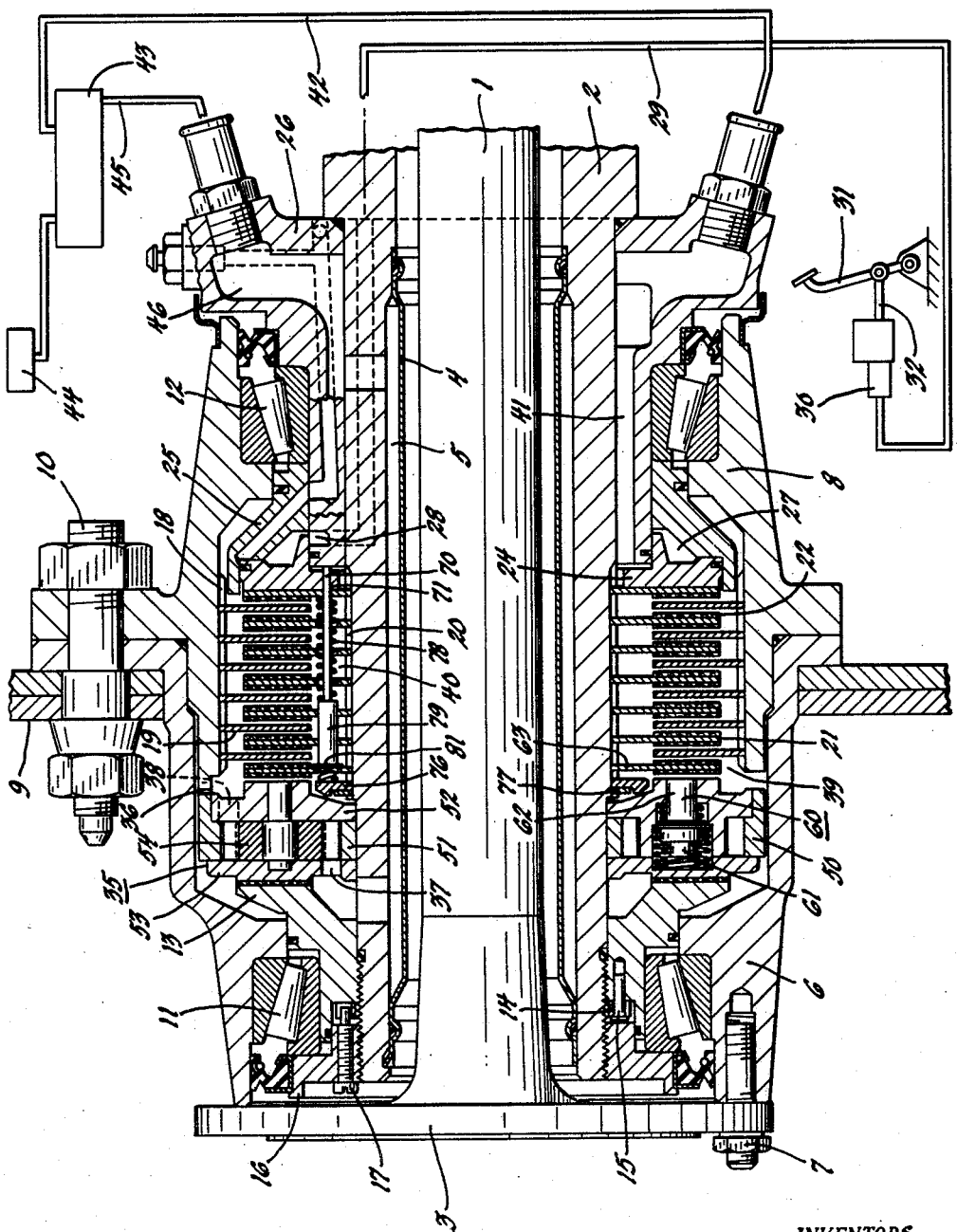
FIGURE 1 is a cross-section view of the vehicle disk brake and shows the relative location of the automatic brake adjuster.

A fluid cooled disk brake is shown in combination with the brake adjuster. The thermally responsive units carried in the cooling fluid pump are also shown; however, a more detailed description and illustration of this portion of the brake is shown in the copending application Serial Number 20,297 of the same assignee, filed April 6, 1960.

FIGURE 1 is the cross-section view showing the combination of the various parts as well as the relative location within the braking structure. The drive shaft 1 rotates within the shaft housing 2 and extends axially outboard to form the radial flange 3. The inner periphery of the shaft housing 2 receives a sleeve 4 which is sealed on both ends to provide a fluid cooling passage 5 between the shaft housing 2 and the sleeve 4. The radial flange 3 of the shaft 1 provides a means for fastening the outer brake housing 6 by means of a plurality of bolts 7. The inner brake housing 8 fits within the inner periphery on the inboard end of the outer brake housing 6. The inner and the outer brake housings are fastened to the wheel 9 by means of a plurality of wheel bolts 10. The outer brake housing 6 is rotatably mounted on the bearing assembly 11 and the inner brake housing 8 is rotatably mounted on the bearing assembly 12.

The reaction plate 13 threadedly engages the outboard end of the shaft housing 2. The locking plate 14 receives the pin 15 to maintain the reaction plate 13 and locking plate 14 in a nonrotating position.

The annular nut 16 provides a means for adjusting the bearings 11 and 12 as it threadedly engages the outboard end of the shaft housing 2. The annular nut 16 is locked in the desired position by means of the lock screw 17. The bearing assemblies 11 and 12 are provided with the desired sealing arrangement.

The inner brake housing 8 is formed with a splined portion 18 for receiving the rotating brake disks 19 on its inner periphery. The outer periphery of the intermediate portion of the shaft housing 2 is also provided with the splined portion 20 for receiving the plurality of stationary disks 21. The plurality of stationary disks 21 are constructed with a friction material 22 for engaging the rotating disks 19.

The brake disks are provided with a means for frictionally engaging with each other including a hydraulic actuating means. Concentrically mounted and spaced axially inboard is placed a hydraulic piston 24. The hydraulic piston 24 is concentrically mounted within a hydraulic cylinder 25 which is mounted on the outer periphery of an oil delivery sleeve 26. The proper sealing arrangement is provided on the piston and cylinder 24 and 25 to form an actuating chamber 27. The actuating chamber 27 is in communication with a passage means 28 and conduit means 29. The conduit means 29 is hydraulically connected to the hydraulic master cylinder 30. Fluid is pressurized within the hydraulic master cylinder 30 by means of the brake pedal 31 operating through the push rod 32. In this manner pressurization of fluid in the master cylinder 30 also pressurizes the fluid within the actuating chamber of the annular hydraulic cylinder 25.

A cooling fluid system is also provided within the braking structure. The cooling fluid system includes a cooling fluid pump assembly 35 which is connected by means of a radial spline 36 to the inner brake housing 8. The cooling fluid pump 35 has an inlet port 37 and an outlet port 38. The outlet port 38 feeds into the hydraulic chamber 39 on the outer periphery of the brake disks. The fluid then passes through a plurality of radial passages 120 formed on the frictional material 22 of the stationary disks. The fluid passes radially inward to the chamber 40. The fluid then returns through the axial passage 41 and is discharged into the conduit 42. The conduit 42 feeds into the reservoir 43. Reservoir 43 is in communication with an expansion chamber 44. The return flow of the cooling fluid is through the conduit 45 and passage means 46. Passage means 46 is in communication with the passage 5 which returns the fluid to the inlet port 37 of the cooling fluid pump 35. The cooling fluid pump 35 rotates with the vehicles wheel due to its connection with the inner brake housing 8. The inner periphery of the cooling fluid pump 35 is rotatably mounted on the outer periphery of the shaft housing 2. In this manner, the ring gear 50 rotates with the inner brake housing 8 at all times when the inner brake housing 8 is in rotation. The sun gear 51 is free to rotate relative to the pump housing 52 and the cover plate 53 as well as the ring gear 50. A plurality of planetary gears 54 are angularly spaced within the pump housing 52. The retardation of the pump housing due to frictional engagement with the outboard stator disk 63 causes a relative movement of the pump housing 52 relative to the ring gear 50. The frictional contact of the cover plate 53, with the reaction plate also being connected to the pump housing 52, causes the retarding force on the pump housing. The action of the planetary gears rotating relative to the ring gear and the sun gear causes the pumping action in pressurization of fluid within the chamber 39 and the outer periphery of the brake disks. The pumping action is created as the vehicle brakes are actuated and the hydraulic wheel piston 24 compresses the disk stack and creates a reaction force on the fluid cooling pump 35 against the reaction plate 13.

An additional feature is provided within this vehicle disk brake and is shown by a thermally responsive unit 60 of which a plurality are mounted within the cooling fluid pump 35. The thermally responsive unit includes an expandable element within the cup 61. As the element within the cup 61 expands, the shell 62 is biased to an axially inboard position to contact the outboard side of the outboard brake disk 63. This, in turn, causes a frictional engagement of the cover plate 53 with the reaction plate 13. This, in turn, causes a retardation of the pump housing 52 relative to the ring gear 50 and consequently a pumping action is generated within the cooling fluid pump. The degree of the pumping is directly responsive to the temperature of the cooling fluid within the braking cooling system.

FIGURE 2 is an enlarged cross section of the combination brake adjuster and retraction means. The combination includes an adjusting sleeve 70 which is resiliently held within an opening 71 in the hydraulic wheel piston 24. The sleeve 70 has a longitudinal slot 72 as shown on its lower side. The slot permits radial contraction of the adjusting sleeve 70 as it is inserted within the opening 71 of the hydraulic wheel piston.

The adjusting sleeve 70 extends axially outboard to receive the retraction pin 73 which is provided with a shoulder 74 to engage the outboard end of the adjusting sleeve 70. The retraction pin 73 is concentrically mounted within the retraction spring 75. The retraction spring is compressibly mounted between the shoulder 74 of the retraction pin 73 and an annulus 76. The annulus 76 is provided with a mating portion to engage the spline section 20 on the outer periphery of the shaft housing 2. The annulus is maintained in this position by means of a snap ring 77. The retraction spring extends through an opening in the outboard stator disk 63 to engage the annulus 76.

The automatic adjuster also includes a means for pre-engaging the outboard stator disk 63 with the pump housing 52 as the vehicle brakes are actuated. This is accomplished by means of a pre-engaging spring 78 mounted concentrically around the adjusting sleeve 70. The pre-engaging sleeve 79 is mounted concentrically around the retraction pin 73. The inboard end of the pre-engaging sleeve 79 is provided with a radial inwardly extending flange 80 to engage the shoulder 74 of the retraction pin 73. The outboard end of the pre-engaging sleeve 79 is provided with an outwardly extending radial flange 81 which engages the outboard stator brake disk 63. In this manner, the spring 78 biases the sleeve 79 to a position which maintains a clearance between the rotating and the stationary disks of the vehicle disk brake. The inboard end of the retraction pin 73 is gripped due to the resilience of the outboard end of the adjusting sleeve 70. A clearance is provided between the outboard side of the outboard stator disk 63 and the inboard side of the pump casing 52. When the cooling fluid of the vehicle disk brake reaches a predetermined temperature, the heat responsive units 60, through an expandable element contained therein, expand to bias the shell 62 to a contacting position on the outboard stator disk 63. This, in turn, biases the cover plate 53 to a contacting position on the reaction plate 13. The outboard stator disk 63, however, is resiliently held in its position to provide a clearance between the rotation and the stationary disks of the vehicle disk brake. Upon actuation of the vehicle brakes, the adjuster sleeve 70 and the retraction pin 73 are permitted to move axially outboard to contact the annulus 77 while the outboard stator disk 63 maintains its contacting position on the inboard side of the pump housing 52.

In this manner, the pre-retraction spring 78 and the pre-retraction sleeve 79 initially engage the stator disk 63 with the pump housing 52 to initially decelerate or retard the pump housing 52 to prevent excessive strain on the pump upon sudden engagement of the vehicle brakes. The pre-engaging spring 78 and the pre-engaging sleeve 79 also provide a reaction means for the thermally responsive unit 60 during the period of after cooling subsequent to release of the vehicle brakes and when the fluid temperature is above the predetermined value.

This device operates in the following described manner. As the pedal 31 is depressed, fluid is pressurized within the master cylinder 30 and the conduit 29. This, in turn, pressurizes the fluid within the passage means 28 and the pressurizing chamber 27 of the hydraulic wheel cylinder. As fluid is pressurized within the hydraulic chamber 27, the hydraulic piston 24 moves axially outboard carrying the brake adjusting sleeve 70. The brake adjusting sleeve 70 carries the pre-engaging spring 78 and the pre-engaging sleeve 79 which biases the outboard stator disk 63 to a contacting position with the pump housing 52. As the stator disk 63 engages the pump housing 52, the cover plate 53 engages the reaction plate 13. The frictional engagement of the cover plate 53 and the pump housing 52 causes a retarding of the pump housing and the cover plate relative to the rotation of the ring gear 50. In this manner, the cooling fluid pump 35 is initially operated prior to the full engagement of the vehicle disk brakes. This provides a slight period of time to accelerate the cooling fluid pump prior to full engagement of the vehicle disk brakes. The cooling fluid pump operates by the action of the rotating of the ring gear with the vehicle wheel and the retardation of the pump housing 52 which, in turn, rotates the plurality of planetary gears 54. The rotation of the planetary gears within the inner periphery of the ring gear 50 and the outer periphery of the sun gear 51 causes a pumping action whereby fluid is drawn in through the inlet port 37. The gear pump 35 then pressurizes fluid within the chamber 39 of the vehicle disk brake.

Further pressurization of fluid within the actuating chamber 27 of the hydraulic wheel cylinder 25 fully engages the stator disk 63 with the pump casing 52. This provides a further retarding of the pump casing 52 and the cover plate 53 relative to the ring gear 50. In this manner, full pumping action is accomplished for cooling of the vehicle brakes when the vehicle brakes are fully actuated.

As the vehicle brakes are fully actuated, the retraction pin 73 abuts the annulus 76. If an excessive clearance exists between the stator disks and the rotor disks of the vehicle disk brake, it will cause the shoulder 74 of the retractor pin to bias the adjusting sleeve 70 to a new position within the opening 71 of the hydraulic wheel piston. This causes a slight movement of the adjusting sleeve 70 within the hydraulic wheel piston and prevents the hydraulic wheel piston 24 from fully returning to its original retracted position.

As the pressurized fluid within the actuating fluid chamber 27 is released, the retraction spring 75, together with the retraction pin 73, biases the adjusting sleeve 70 to return the hydraulic wheel piston 24 to its retracted position. The adjusting sleeve 70 prevents the hydraulic wheel piston from fully returning to its original position as the sleeve 70 extends slightly farther through the opening 71. The inboard end of the adjusting sleeve 70 then abuts the outboard end of the oil delivery sleeve to provide the new position for the hydraulic wheel cylinder 24 in its retracted position.

When the hydraulic wheel piston 24 is in its retracted position, the pre-engaging spring 78 and the pre-engaging sleeve 79 are biased to a contacting position against the outboard stator disk 63. This position provides a predetermined clearance between the rotating and the stator disks of the vehicle disk brake. The gripping effect of the outboard end of the adjusting sleeve 70 prevents the retraction pin 73 from further extension relative to the adjusting sleeve 70. This provides a predetermined clearance between the brake disks. In the event that the cooling fluid of the cooling fluid system is above a predetermined temperature, the heat responsive means comprising a plurality of heat responsive units 60 carried within the cooling fluid pump operates to expand the shell 62 to contact the outboard side of the stator disk 63. The expansion of the heat responsive unit biases the cover plate 53 to a contacting position on the reaction plate 13 as well as the shell 62 of the heat responsive unit contacting the stator disk 63. This, in turn, causes retardation of the rotation of the cover plate 53 and the pump housing 52 and thereby causes a pumping action of the cooling fluid pump. The pumping action is directly responsive to the temperature of the heat responsive unit which controls the frictional engagement of the fluid cooling pump with the stator disk 63 and the reaction plate 13. With a decrease in temperature, a decreased frictional engagement is present. The pre-engaging spring 78 and the pre-engaging sleeve 79 provide a predetermined clearance between the stationary and the rotating disks and also a reaction means to provide operation of the cooling fluid pump in response to the temperature of the cooling fluid.

The automatic brake adjuster in this manner provides automatic adjustment of the vehicle brakes by providing a predetermined clearance between the rotating and the stationary disks. The automatic adjuster also provides, through the pre-engaging spring 78 and the pre-engaging sleeve 79, a means for prior engagement of the stator disk 63 and prior accelerating operation of the fluid cooling pump prior to the full engagement of the vehicle disk brakes. This provides a more satisfactory operation of the cooling fluid pump in that the shock of sudden actuation of the brakes is somewhat softened.

The automatic brake adjuster comprises the retraction spring 75 and the retraction pin 73 in combination with the adjusting sleeve 70. This combination retracts the annular hydraulic wheel piston 24 when the vehicle brakes are released.

In the event that the temperature of the cooling fluid is above a predetermined value, the cooling fluid pump also provides after-cooling effect for the vehicle disk brakes. This is accomplished through the expansion of the thermally-responsive units carried within the cooling fluid pump which expand and frictionally engage the stator disk 63 and thereby provide operation of the cooling fluid pump. This is made possible through the pre-engaging spring 78 and the pre-engaging sleeve 79 biasing the stator disk 63 to a position whereby the heat responsive units engage the stator disk. This, in turn, biases the cooling fluid pump to provide limited cooling action subsequent to the release of the vehicle brakes when the cooling fluid is above a predetermined value.

While the embodiments of the present invention as herein disclosed constitute preferred forms, it is to be understood that other forms might be adopted.

What is claimed is as follows:

1. In a vehicle disk brake, comprising in combination, a rotating member, a rotating disk connected to said rotating member, a stationary member, a stationary disk connected to said stationary member for frictionally engaging said rotating disk, an annular hydraulic wheel cylinder mounted concentric with said disks, an annular hydraulic piston mounted concentrically within said hydraulic wheel cylinder forming a fluid chamber, means for pressurizing fluid in said hydraulic chamber for actuation of said vehicle brakes by engaging said disks, reaction means concentrically mounted on the opposite side of the disk stack for assisting in actuation of said brakes, a brake adjuster including an adjuster member extending through and gripping an opening in said hydraulic wheel piston to engage a stop portion on said stator member, resilient means to bias said hydraulic wheel piston to a retracted position and causing said adjuster member to engage said stop means, a pre-engaging spring and a pre-engaging sleeve carried concentrically on said brake adjuster biasing a stator disk to provide predetermined clearance between said stator disk and said wheel piston when said brake is in the retracted position, a cooling fluid pump positioned between said reaction means and said stator disk and engaging said stator disk to provide a prior operation of said cooling fluid pump prior to frictional engagement of said disks during brake actuation.

2. In a vehicle disk brake, comprising in combination; a rotating member, a rotating disk connected to said rotating member, a stationary member, a stationary disk connected to said stationary member for frictionally engaging said rotating disk, an annular hydraulic wheel cylinder mounted concentrically on said stator member adjacent to said disks, an annular hydraulic wheel piston forming a pressurizing chamber with said annular hydraulic wheel cylinder, means for pressurizing fluid in said pressurizing chamber, reaction means mounted on said stator member on the opposite side of the disk stack from said hydraulic wheel cylinder, a cooling fluid pump disposed between said reaction means and said disk stack, a brake adjuster including adjusting means carried on said piston providing a predetermined clearance between said piston and a stator disk adjacent said pump, means engaging said stationary member and said adjusting means retracting said hydraulic wheel piston to a retracted position upon release of said vehicle disk brakes, means carried on said piston pre-engaging said stator disk of said disk stack with said cooling fluid pump to frictionally engage said reaction means and thereby provide prior operation of said cooling fluid pump to the actuation of said vehicle brakes when said vehicle brakes are actuated.

3. In a vehicle disk brake, comprising in combination; a rotating member, a rotating disk connected to said rotating member, a stationary member, a stationary disk connected to said stationary member for frictionally engaging said rotating disk, an annular hydraulic wheel cylinder mounted on said stator member, an annular hydraulic wheel piston forming a pressurizing chamber with said hydraulic cylinder, means for pressurizing fluid in said pressurizing chamber for actuation of said vehicle brakes, a reaction plate mounted on said stator member, a cooling fluid pump disposed between said reaction plate and the disk stack of said vehicle brake, an automatic brake adjuster including a brake adjusting tube extending through and gripping an opening in said hydraulic wheel piston to provide a predetermined clearance between said brake disks, a retraction means in combination with said brake adjuster for retracting said hydraulic wheel piston, a pre-engaging spring and a pre-engaging sleeve on said brake adjusting tube engaging the stator disk adjacent said fluid cooling pump to bias said fluid cooling pump to an engaging position with said reaction plate and thereby provide operation of the cooling fluid pump prior to frictional engagement of the brake disks in response to pressurizing of fluid in said pressurizing chamber when said vehicle brakes are actuated.

4. In a vehicle brake, comprising in combination; a rotating member, a rotating disk connected to said rotating member, a stationary member, a stationary disk connected to said stationary member for frictionally engaging said rotating disk, hydraulic means for actuating said vehicle brake including a hydraulic wheel cylinder, a hydraulic wheel piston forming a pressurizing fluid chamber with said hydraulic cylinder, means for pressurizing fluid in said pressurizing chamber for actuating said vehicle brake, reaction means mounted on said stator member for receiving the reaction force when said vehicle brakes are actuated, a cooling fluid pump disposed between said reaction means and the disks, a plurality of brake adjusters angularly spaced about the inner portion of said brake including an adjusting sleeve frictionally engaging the inner periphery of an opening in said wheel piston, a pin frictionally engaging said sleeve and extending from said sleeve, a stop means mounted on said stator member, a predetermined distance from the extended end of said pin for determining the clearance between said brake disks when said brake is in the retracted position, said stop means engaging the end of said pin when said vehicle brakes are actuated, thereby maintaining a predetermined clearance between said brake disks, a retraction spring concentrically mounted on said pin biasing said pin and said adjusting sleeve to a retracted position and engaging the opposite end of said sleeve extending through said wheel piston against a second stop means and the pre-set adjustment of said brake disks, a pre-engaging sleeve concentrically mounted on said pin and extending to engage the stator disk adjacent said cooling fluid pump, a pre-engaging spring resiliently biasing said pre-engaging sleeve to a contacting position on said stator brake disk adjacent said pump and to maintain a predetermined clearance between said brake disk and said reaction plate and also to provide pre-engaging of said stator brake disks with said cooling fluid pump thereby providing prior operation of said cooling fluid pump to frictional engagement of the disks when said vehicle brakes are actuated.

5. In a vehicle brake, comprising in combination; a rotating member, a rotating disk connected to said rotating member, a stationary member, a stationary disk connected to said stationary member for frictionally engaging said rotating disk, a hydraulic means for actuating said vehicle brake including an annular hydraulic wheel cylinder, an annular hydraulic wheel piston forming a pressurizing chamber in said annular hydraulic wheel cylinder, means for pressurizing fluid in said pressurizing chamber for actuating said vehicle brakes, a reaction plate mounted on said stationary member, a fluid cooling system including a fluid cooling pump mounted on said stationary member between said reaction plate and the adjacent stationary disk, a plurality of adjusters angularly spaced about the inner portion of said brake each including a brake adjusting sleeve frictionally engaging the inner periphery of an opening in said annular hydraulic wheel piston, a sleeve frictionally engaged in the outer end of said brake adjusting sleeve and extending to a point adjacent to a stop means, said stop means mounted on said stator member a predetermined distance from the end of said pin when said vehicle brakes are in the retracted position and engaging the outer end of said pin to provide a brake adjusting means when said vehicle brakes are actuated, a second stop means mounted on said stator member for engaging the opposite end of said brake adjusting sleeve thereby maintaining a predetermined clearance between said brake disks when said vehicle brakes are actuated, a pre-engaging sleeve mounted on the outer periphery of said pin and extending to engage said adjacent stationary disk, a spring resiliently maintaining the extended position of said sleeve and maintaining a predetermined distance between said reaction plate and said adjacent stationary disk when said vehicle brake is in the retracted position and pre-engaging said adjacent stationary disk with said cooling fluid pump to provide initial operation of said cooling fluid pump prior to full engagement of said vehicle brakes when said vehicle brakes are actuated.

6. In a vehicle brake, comprising in combination; a rotating member, a rotating disk connected to said rotating member, a stationary member, a stationary disk connected to said stationary member for frictionally engaging said rotating disk, a hydraulic means for actuating said vehicle brake including an annular hydraulic wheel cylinder, an annular hydraulic wheel piston forming a pressurizing chamber for actuation of said vehicle brakes, means for pressurizing fluid in said pressurizing chamber, a reaction means mounted on said stator member, a fluid cooling system including a cooling fluid pump mounted on said stationary member between said reaction means and the adjacent stationary disks, a plurality of brake adjusters angularly spaced about the inner portion of said brake each including a brake adjusting sleeve frictionally engaging the inner periphery of an opening in said annular hydraulic wheel piston, a pin having a shouldered portion frictionally held within the extended end of said adjusting sleeve, a stop member mounted on said stator member a predetermined distance beyond the extended end of said pin for determining the adjusted clearance between said brake disks, a retraction spring concentrically mounted on said pin for biasing said wheel piston to a normally retracted position when said vehicle brakes are retracted, a pre-engaging sleeve concentrically mounted on said pin and engaging said shoulder portion, a pre-engaging spring resiliently mounted between said annular hydraulic wheel piston and engaging said pre-engaging sleeve to provide pre-engagement of said adjacent disk with said cooling fluid pump and operation of said cooling fluid pump prior to frictional engagement of the disks when said vehicle brakes are actuated.

7. In a vehicle brake, comprising in combination; a rotating member, a rotating brake disk connected to said rotating member, a stationary member, a stationary brake disk connected to said stationary member for frictionally engaging said rotating brake disk when said vehicle brakes are actuated, a hydraulic means for actuating said vehicle brakes including an annular hydraulic wheel cylinder, an annular hydraulic wheel piston forming a pressurizing chamber, means for pressurizing fluid within said pressurizing chamber for actuating said vehicle brakes, reaction means mounted on said stator member opposite the disk stack of said vehicle disk brake for receiving the reaction force when said vehicle brakes are actuated, a fluid cooling system including the fluid cooling pump rotatably mounted on said stator member between said reaction means and said disk stack, a plurality of brake adjusters angularly spaced about the inner portion of said brake each including an adjusting sleeve for frictionally engaging inner periphery of an opening in said annular hydraulic wheel piston, a pin frictionally engaging inner periphery of said adjusting sleeve, said pin having a shouldered portion engaging the extended end of said sleeve, a stop member mounted on said stationary member for engaging the end of said pin to maintain a predetermined clearance between said vehicle brake disks, a plurality of thermally responsive units carried in said cooling fluid motor for frictionally engaging the adjacent stator disk and biasing said cooling fluid pump to frictionally engage said reaction means for after cooling of said vehicle brakes when said cooling fluid is above the predetermined temperature, a pre-engaging sleeve mounted on said pin and engaging said shoulder, a pre-engaging spring resiliently biasing said pre-engaging sleeve to a contacting position on said adjacent stator disk to provide pre-engagement of said adjacent stator disk with said cooling fluid pump to provide operation of said cooling fluid pump prior to full actuation of said vehicle brake when said vehicle brakes are actuated.

8. In a vehicle brake, comprising in combination; a rotating member, at least one rotating brake disk connected to said rotating member, a stationary member, at least one stationary brake disk connected to said stationary member for frictionally engaging said rotating brake disk when said vehicle brakes are actuated, a hydraulic means for actuating said vehicle brakes including an annular hydraulic wheel cylinder mounted on said stationary member, an annular hydraulic wheel piston forming a pressurizing chamber with said haydraulic wheel cylinder, means for pressurizing fluid in said pressurizing chamber for actuating said vehicle brakes, reaction means mounted on said stationary member opposite of the disk stack of said vehicle disk brake for receiving the reaction force when said vehicle brakes are actuated, a cooling fluid system including a cooling fluid pump rotatably mounted on said stationary member between said reaction means and said disk stack, a plurality of brake adjusters angularly spaced about the inner portion of said brake each including an adjusting sleeve having a longitudinal slot for the length of the sleeve, said adjusting sleeve for reception within an opening within said annular hydraulic wheel piston and resiliently expanding about the inner periphery of said opening for resisting relative axial movement of said adjusting sleeve relative to said hydraulic wheel piston, a pin received in the extended end of said adjusting sleeve whereby said sleeve radially contracts to frictionally maintain a constant relative axial position to said ajusting sleeve, said pin having a shouldered portion engaging the extended end of said sleeve, a stop member mounted on the said stationary member for engaging the extended end of said pin to maintain a predetermined clearance between said vehicle brake disks when said vehicle brakes are actuated, a retraction spring concentrically mounted about said adjusting pin engaging said shouldered portion of said pin of said stop portion to retract said hydraulic wheel piston when said vehicle brakes are released, a pre-adjusting sleeve having a radially inwardly extending flange to engage said shouldered portion of said pin, said pre-engaging sleeve extending axially to engage the stator disk adjacent to said fluid cooling pump and maintaining a predetermined clearance between said stationary disk and said reaction means, a pre-engaging spring engaging said radially inwardly expanding flange of said engaging sleeve and said hydraulic wheel piston, said pre-engaging spring on said pre-engaging sleeve thereby providing preengagement of said stationary disk and operation of said cooling fluid pump prior to full engagement of said vehicle brake disks when said vehicle brake is actuated.

9. In a vehicle brake, comprising in combination; a rotating member, at least one rotating brake disk connected to said rotating member, a stationary member, at least one stationary brake disk connected to said stationary member for frictionally engaging said rotating brake disk when said vehicle brakes are actuated, a hydraulic means for actuating said vehicle brakes including, an annular hydraulic wheel cylinder, an annular hydraulic wheel piston forming a pressurizing chamber with said hydraulic wheel cylinder, means for pressurizing fluid within said pressurizing chamber for actuating said vehicle brakes, reaction means mounted on said stationary member for receiving the reaction force of said vehicle brakes when said brakes are actuated, a cooling fluid pump rotatably mounted on said stator member and disposed between the adjacent stationary brake discs and said reaction means, a plurality of brake adjusters spaced about the inner portion of said brake each including an adjusting sleeve, said adjusting sleeve having a longitudinally extending slot, an opening in said hydraulic wheel piston for reception of said adjusting sleeve, said adjusting sleeve expanding radially to provide frictional engagement with said hydraulic wheel piston thereby resisting axial relative movement of said sleeve relative to said hydraulic wheel piston, an adjusting pin having a shouldered portion for reception within said adjusting sleeve with said shoulder abutting the extended end of said adjusting sleeve, a stop means formed on said stator member for engaging the extended end of said adjusting pin and positioned a predetermined distance from said pin to maintain a clearance between said vehicle brake disks, a preengaging sleeve mounted concentrically about the outer periphery of said pin having a radially inwardly extending flange to engage said shouldered portion of said adjusting pin, a pre-engaging spring positioned between said pre-engaging sleeve and said hydraulic wheel piston, said pre-engaging spring and said pre-engaging sleeve engaging said adjacent stator brake disks to provide a predetermined clearance between said adjacent brake disk and said reaction means and pre-engaging said adjacent brake disk with said cooling fluid pump for operating said fluid cooling pump prior to full engagement of said brake disks when said vehicle brakes are actuated.

References Cited in the file of this patent
UNITED STATES PATENTS

| | | |
|---|---|---|
| 2,384,297 | Goepfrich | Sept. 4, 1945 |
| 2,828,840 | Kelley et al. | Apr. 1, 1958 |